US006692180B2

(12) United States Patent
Wu

(10) Patent No.: US 6,692,180 B2
(45) Date of Patent: Feb. 17, 2004

(54) CONNECTING ELEMENT OF A LAMP TUBE

(76) Inventor: Wen-Chang Wu, 235 Chung - Ho Box 8-24, Taipei (TW)

( * ) Notice: Subject to any disclaimer, the term of this patent is extended or adjusted under 35 U.S.C. 154(b) by 58 days.

(21) Appl. No.: 10/034,935

(22) Filed: Jan. 2, 2002

(65) Prior Publication Data

US 2003/0123927 A1 Jul. 3, 2003

(51) Int. Cl.[7] .................................................. F16B 7/00

(52) U.S. Cl. ......................... 403/292; 403/296; 403/21; 403/22; 403/166

(58) Field of Search ................................ 403/291, 292, 403/296, 297, 299, 113, 318, 22, 21, DIG. 5, 166; 362/410, 414, 431

(56) References Cited

U.S. PATENT DOCUMENTS

| | | | | |
|---|---|---|---|---|
| 2,298,516 A | * | 10/1942 | Streib | 403/296 |
| 3,387,865 A | * | 6/1968 | Ross | 403/292 |
| 3,913,649 A | * | 10/1975 | Stanaitis | 411/134 |
| 4,106,170 A | * | 8/1978 | Schoeneweis | 403/166 |

FOREIGN PATENT DOCUMENTS

| | | | | |
|---|---|---|---|---|
| DE | 2632696 A | * | 1/1978 | F16B/7/00 |
| GB | 540858 A | * | 11/1941 | 403/297 |
| GB | 596582 A | * | 1/1948 | 403/296 |

* cited by examiner

*Primary Examiner*—Lynne H. Browne
*Assistant Examiner*—Ernesto Garcia

(57) ABSTRACT

A connecting element of a lamp tube comprises a retaining block, a joint, a resisting block and a buffer pad. The distal end of the joint is installed with a threaded section. The middle section of the joint has an embedding portion. Thereby, the resisting block is exactly passed through by the threaded portion of the joint and a lateral side of the embedding portion of the joint is formed with a limiting groove. The resisting block has a position hole at position exactly aligned with the limiting groove. After a pin passes through the positioning hole, a distal end of the pin exactly protrudes into the limiting groove. The buffer pad is positioned between a large stepped end and the resisting block so that a resisting buffering area is formed between the joint and the resisting block. Thereby, a connecting element having a simple structure is formed.

2 Claims, 4 Drawing Sheets

CONNECTING ELEMENT OF A LAMP TUBE

BACKGROUND OF THE INVENTION

1. Field of the Invention

The present invention relates to connectors, and particularly to a connecting element of a lamp tube.

2. Description of Related Art

In the conventional connecting element of a lamp tube, in general, the upper and lower lamp sections are installed with male and female threads for engagement. However, this is only suitable for round lamp tubes and not suitable for other polygonal shapes.

Thereby, some other structures are developed, that is, for lamp tubes of other polygonal- shapes, a section of the lamp tube is added with a threaded rod as a male thread, and the other section of the lamp tube is added with a sleeve having a threaded hole therein as a female thread. However, such structure has a defect. Namely, when the two sections of the lamp tube are locked, as two threads are engaged properly, it is often that the two lamp tube sections can not be matched well.

SUMMARY OF THE INVENTION

Accordingly, the primary object of the present invention is to provide a connecting element of a lamp tube comprising a retaining block firmly secured to a first lamp tube section, a joint engaged into a second lamp tube section and exactly locked in the retaining block, and a resisting block and a buffer pad resisting against the joint. The distal end of the joint is installed with a threaded section. A middle section of the joint has an embedding portion. Thereby, the resisting block is exactly passed through by the threaded portion of the joint and is then buckled to the embedded portion so as to rotate with the resisting block synchronously; and a lateral side of the embedding portion of the joint is formed with a limiting groove. The resisting block has a position hole at position exactly aligned with the limiting groove. After a pin passes through the positioning hole, a distal end of the pin exactly protrudes into the limiting groove of the joint for preventing that the joint is separated from the resisting block. The buffer pad is positioned between a large stepped end and the resisting block so that a resisting buffering area is formed between the joint and the resisting block. Thereby, a connecting element having a simple structure and capable of being assembled easily is formed.

The various objects and advantages of the present invention will be more readily understood from the following detailed description when read in conjunction with the appended drawing.

DETAILED DESCRIPTION OF THE PREFERRED EMBODIMENTS

Figure 1:
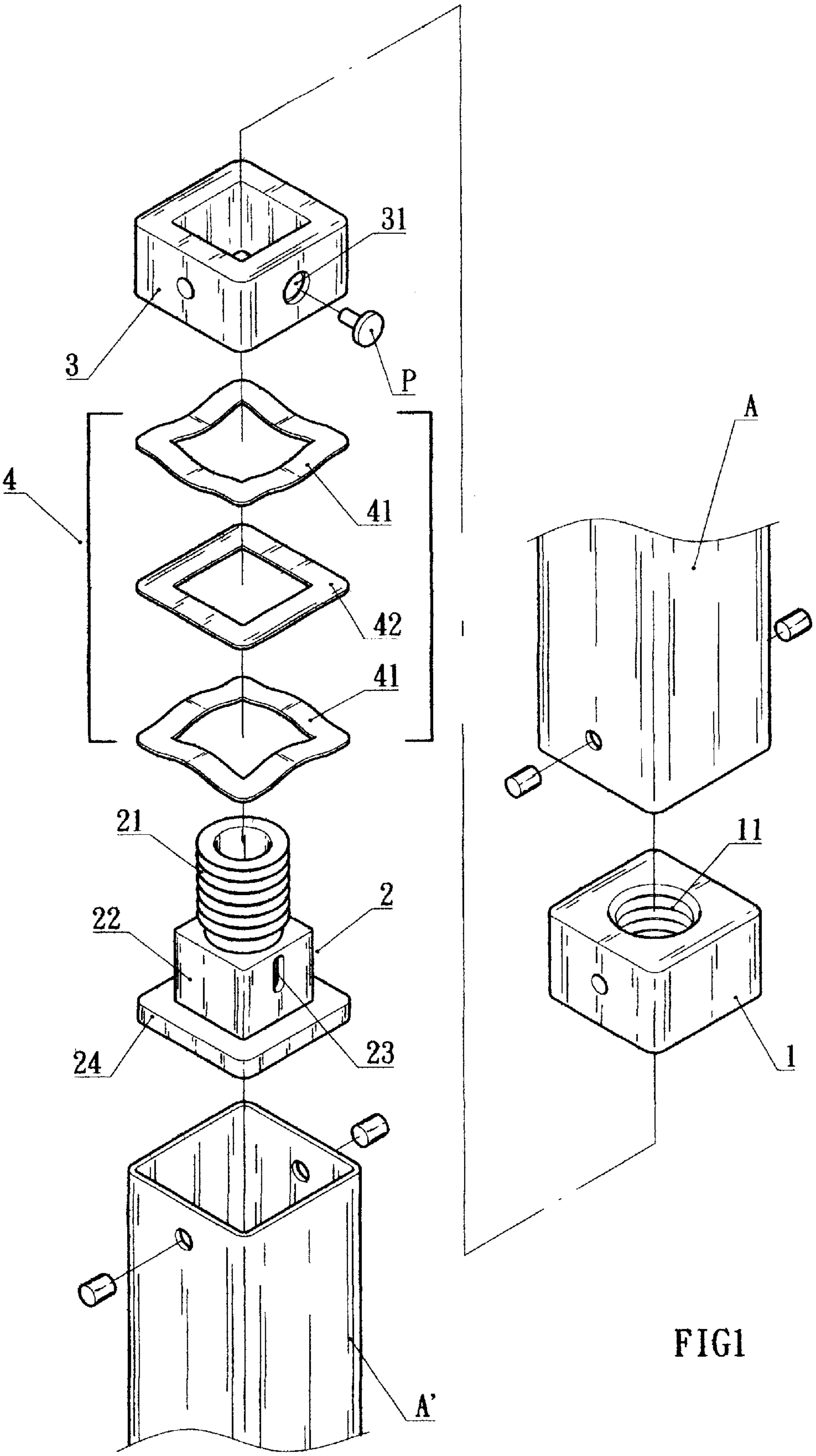
FIG. 1 is an exploded perspective view of the present invention.
Figure 2:
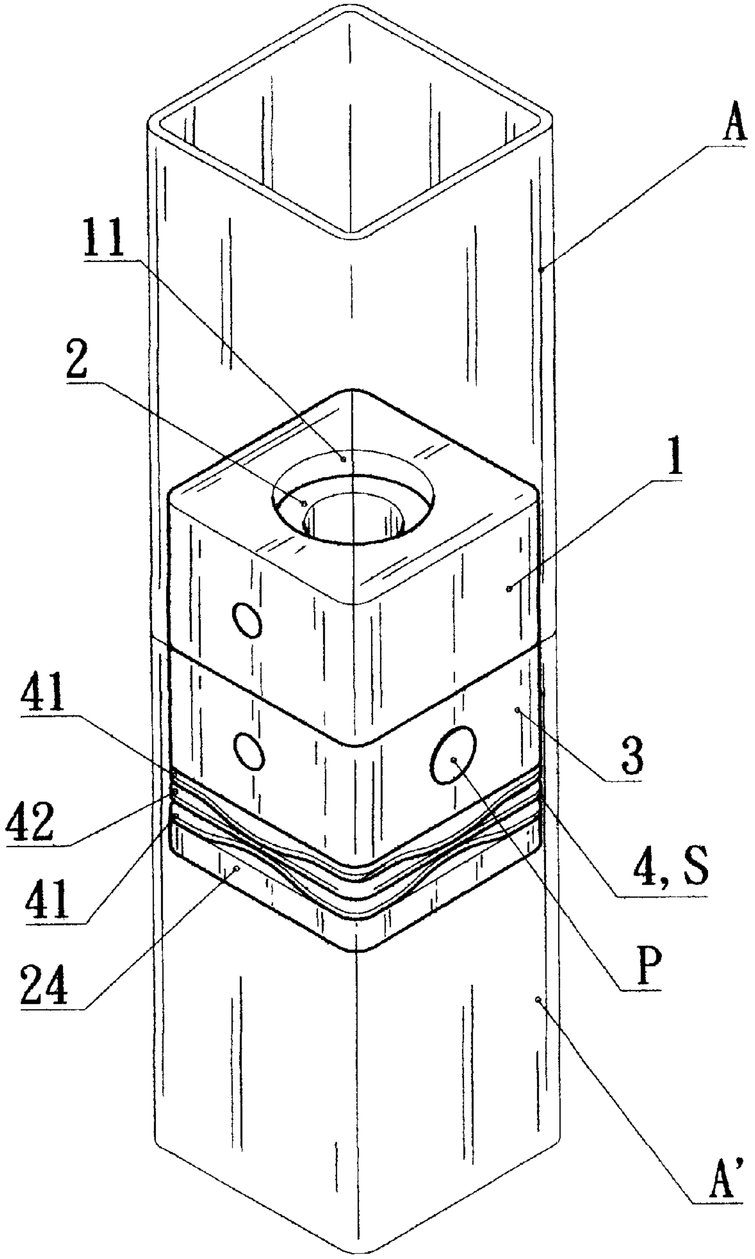
FIG. 2 is an assembled perspective view of the present invention.

Referring to FIGS. 1 and 2, the structure of the present invention is illustrated. The present invention is mainly formed by a retaining block 1 firmly secured into the first lamp tube section A, a joint 2 engaged into the second lamp tube section A' and exactly locked into the retaining block 1, and a resisting block 3 and a buffer pad resisting against the joint 2.

The retaining block 1 has a shape matching that of the first lamp tube section A and is engaged into the inner edge of the first lamp tube section A. A center of the retaining block 1 has a threaded hole 11 for being screwed by a threaded section at a distal end of the joint 2.

The joint 2 has a threaded rod with a "T" shape. The distal end of the joint 2 is installed with a threaded section 21. A middle section of the joint 2 has an embedding portion 22. Thereby, the resisting block 3 is exactly passes through by the threaded portion 21 of the joint 2 and is then buckled to the embedded portion 22 so as to rotate with the resisting block 3 synchronously. The lateral side of the embedding portion 22 of the joint 2 is formed with a long limiting groove 23. After the joint 2 is inserted into the resisting block 3. The large stepped end 24 is inserted into the second lamp tube section A'. Then pins P are used to lock it with the second lamp, tube section A'.

The resisting block 3 has a position hole 31 at position exactly aligned with the limiting groove 23. After the pin P passes through the positioning hole 3i, the distal end of the pin P exactly protrudes into the limiting groove 23 of the joint 2 for preventing the separation of the joint 2 and the resisting block 3.

The buffer pad 4 is formed by two symmetrical reeds 41 and a washer 42 between the two reeds. The middle part of each side of the reed protrudes upwards with a predetermined height. The buffer pad 4 is positioned between the large stepped end 24 and the resisting block 3. The protruding ends of the two reeds 41 are aligned to the lateral side of the large stepped end 24 of the joint 2 and the lateral side of the resisting block 3 so as to be formed as a resisting buffering area S.

Figure 3:
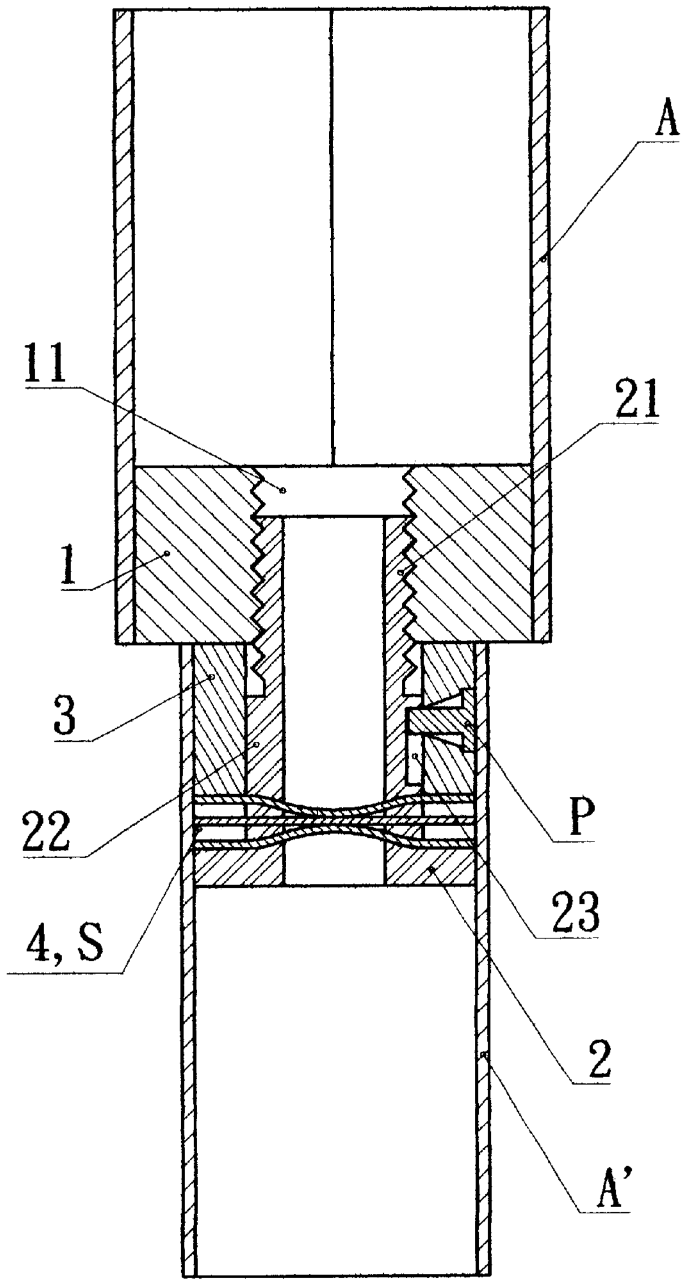
FIG. 3 is a cross sectional view of the present invention, wherein the lamp tube is being positioned.
Figure 4:
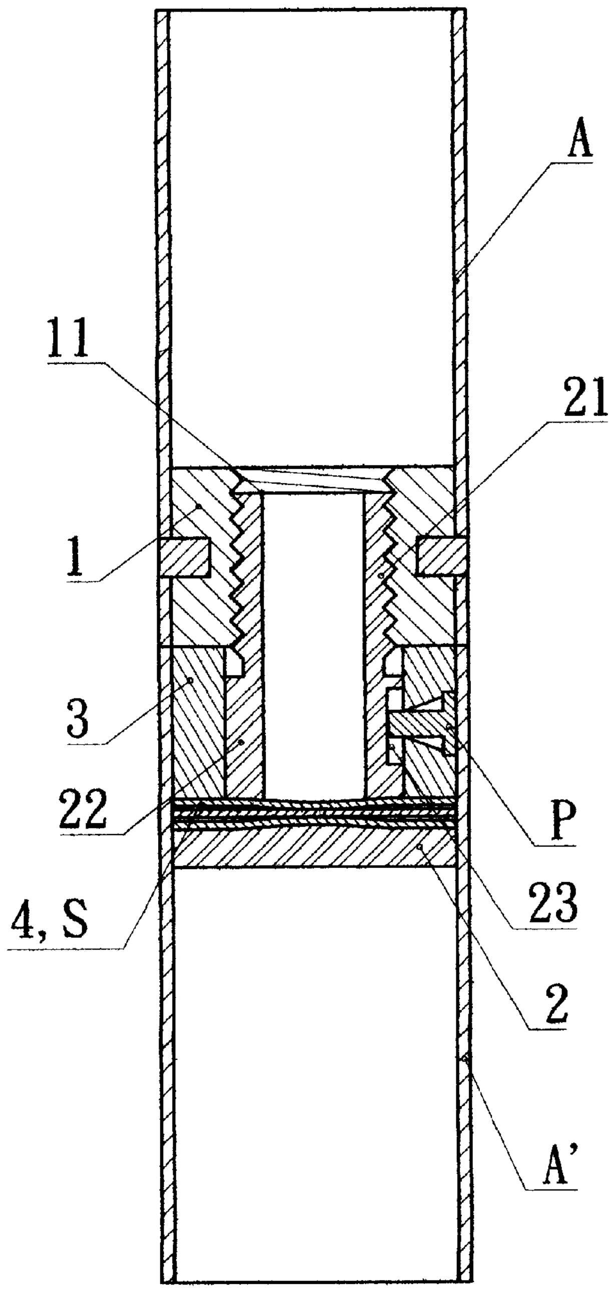
FIG. 4 is a cross sectional view of the present invention, wherein the lamp tube has been positioned.

Referring to FIGS. 3 and 4, the resisting block 3 is assembled with the resisting block 3 by a pin P so as to be fixed in the first lamp tube section A. Thereby, the embedding portion 22 is fixed into the joint 2. As the two—sectional lamp tube section are installed, they are rotated synchronously. When the first and second polygonal lamp tube sections A, A' with the joint 2 and retaining block 1 are locked, the threaded portion 21 of the joint 2 is locked into the threaded hole II of the retaining block 1.

When they are locked so that the resisting block- 3 resists against the retaining block 1, the first and second lamp tube sections A, A' have been positioned properly (referring to FIG. 3). However, since the lamp tube section has a polygonal shape, in general the edges of the first and second lamp tube sections A, A' can not be aligned completely. Now, they can be further rotated and locked so that the joint 2 can be locked into the resisting block 3 further to resist against the buffer pad 4 until the first and second lamp tube sections A, A' are aligned (referring to FIG. 4). Thereby, buffer pad 4 is formed as a buffer area S as the two lamp tube sections A, A' are locked.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A connecting element of a lamp tube comprising: the lamp tube comprising a first lamp tube section and a second lamp tube section; the connecting element comprising a retaining block firmly secured to the first lamp tube section, a joint engaged into the second lamp tube section and exactly locked in the retaining block, and a resisting block and a buffer pad resisting against the joint;

a distal end of the joint is installed with a threaded section; a middle section of the joint has an embedding portion; thereby, the resisting block being exactly passed through by the threaded portion of the joint and is then buckled to the embedding portion so as to rotate with the resisting block synchronously; and a lateral side of the embedding portion of the joint is formed with a limiting groove;

the resisting block has a position hole at position exactly aligned with the limiting groove; after a pin passes through the position hole, a distal end of the pin exactly protrudes into the limiting groove of the joint for preventing that the joint is separated from the resisting block; and the buffer pad is positioned between a large stepped end and the resisting block so that a resisting buffering area is formed between the joint and the resisting block;

wherein the buffer pad comprises two symmetrical reeds and a washer between the two reeds; a middle part of each side of the reed protrudes upwards with a predetermined height; the large stepped end of the joint and a lateral side of the resisting block;

thereby, a connecting element has a simple structure and capable of being assembled easily is formed.

2. The connecting element of the lamp tube as claimed in claim 1, wherein the limited groove is a long limited groove.

* * * * *